Patented Sept. 3, 1935

2,013,035

UNITED STATES PATENT OFFICE 2,013,035

FLUORINATION PROCESS

Herbert Wilkens Daudt, Wilmington, Del., and Howard Maurice Parmelee, Salem, N. J., assignors to E. I. du Pont de Nemours & Company, Wilmington, Del., a corporation of Delaware No Drawing. Application June 9, 1933, Serial No. 675,145

20 Claims. (Cl. 260—162)

This invention relates to fluorine compounds, more particularly organic fluorine compounds, and a process for the production thereof.

It is an object of the present invention to provide a new and improved process for the production of organic fluorine compounds. A further object is the provision of a new and improved method of fluorinating organic materials by means of elemental fluorine. Other objects will appear hereinafter.

These objects are accomplished according to this invention by the fluorination of organic materials with elemental fluorine in a liquid fluorochloro aliphatic hydrocarbon which is substantially inert to the reactants under the conditions of reaction.

While the invention is susceptible of considerable variation and modification in the manner of its practical application, particularly as regards the nature of the reaction medium, the material reacted upon, the conditions of temperature and pressure, and the exact method of procedure, the following examples, in which the parts are by weight, will illustrate how the invention may be practised.

Example I

Seventy-nine parts of o-dichlorobenzene were dissolved in a mixture of 150 parts of trifluorotrichloroethane and 118 parts of tetrafluorodichloroethane in a copper flask, provided with a reflux condenser and with mechanical agitation. The reflux condenser was cooled to about $-70°$ C. by a suitable refrigerant and was equipped with a valve at its outlet. The flask was agitated in a suitably cooled bath so that the inside temperature was maintained at about $-40°$ C., and fluorine gas was added above the surface of the liquid until a portion of the air had been displaced. This operation was of advantage in subsequently aiding in the complete absorption of the fluorine. The valve was then closed and fluorine passed into the flask until 25 parts had been absorbed. The flask was then removed and allowed to warm. The contents were then washed free of acid, and the product separated by fractional distillation. Products containing more than 14% fluorine were obtained.

Example II

Seventy-three parts of benzotrifluoride were dissolved in 193 parts of trifluorotrichloroethane and 102 parts of tetrafluorodichloroethane, and treated with 60 parts of fluorine at $-40°$ C. in the manner described in Example I. The products were washed free from acid and separated by fractional distillation. Fluorinated compounds containing 48% fluorine and having a molecular weight of 195.6 were obtained. In addition, diphenyl derivatives formed by the elimination of hydrogen between two molecules of benzotrifluoride were obtained, containing 41.91% fluorine and having a molecular weight of 280.7. Condensation products of higher order having a molecular weight of 391.1 to 410.3 were also obtained.

Example III

Seventy-eight parts of benzene were dissolved in 120 parts of trifluorotrichloroethane and 112 parts of tetrafluorodichloroethane, and 40 parts of fluorine passed into the flask at $-50°$ C. in the manner described in Example I. Products containing more than 4% fluorine were obtained.

Example IV

Thirty parts of diethylether were mixed with 120 parts of trifluorotrichloroethane and fluorinated at $-40°$ C. as in Example I.

Example V

Ten parts of benzoic acid were dissolved in 120 parts of tetrafluorodichloroethane and fluorinated at $-40°$ C. according to the procedure described in Example I. Acidic fluorinated products were obtained.

Example VI

Sixty parts of o-dichlorobenzene were dissolved in 250 parts of trifluorotrichloroethane and fluorinated according to the procedure described in Example I, except that the temperature was maintained at $-25°$ C. Fluorochlorobenzenes were obtained.

Example VII

Sixty parts of o-dichlorobenzene were dissolved in 250 parts of tetrafluorodichloroethane and fluorinated according to the procedure of Example I, except that the temperature was maintained at $0°$ C. Fluorochlorobenzenes were obtained.

Example VIII

Sixty parts of benzotrifluoride were mixed with 200 parts of difluorodichloromethane and fluorinated according to the procedure of Example I, except that the temperature was maintained at $-29.2°$ C.

Example IX

Fifty parts of benzotrifluoride were mixed with 200 parts of difluorodichloromethane and fluorinated according to the procedure of Example I, except that the fluorination was carried out under pressure of 15 pounds per square inch at −25° C. Fluorinated benzotrifluoride derivatives were obtained.

Example X

Twenty-five parts of divinylacetylene were mixed with 120 parts of trifluorotrichloroethane and 70 parts of difluorodichloromethane and treated with fluorine at −60° C. according to the procedure described in Example I. Fluorinated hexane derivatives were obtained.

Example XI

Twenty-five parts of benzene sulfonyl fluoride were dissolved in 120 parts of trifluorotrichloroethane, and 80 parts of difluorodichloromethane and fluorinated according to the procedure of Example I.

Example XII

Seventy parts of dichloropentane were mixed with 122 parts of trifluorotrichloroethane and 60 parts of difluorodichloromethane and treated at −40° C. with fluorine according to the procedure described in Example I. After separating the solvent and hydrofluoric acid, products containing more than 5% fluorine were obtained.

Example XIII

Seventy parts of tetrachlorobenzotrifluoride were mixed with 180 parts of trifluorotrichloroethane and 60 parts of tetrafluorodichloroethane and treated at −40° C. with 30 parts of fluorine according to the procedure described in Example I. The product contained 38.1% fluorine and 35.7% chlorine compared to 15.4% fluorine and 50.6% chlorine in the substance before fluorination. In this operation, fluorine replaced both hydrogen and chlorine in the nucleus.

Example XIV

Thirty-five parts of hexane were mixed with 60 parts of trifluorotrichloroethane and 88 parts of tetrafluorodichloroethane and fluorinated with 32 parts of fluorine at −40° C. according to the procedure described in Example I.

Example XV

Twenty parts of benzotrifluoride were mixed with 400 parts of difluorodichloromethane and the mixture held at its boiling point under a reflux condenser, cooled to −60° C. Fluorine was passed into the boiling mixture until it was no longer completely absorbed. Fluorinated aromatic products were obtained.

The invention is generally applicable to the fluorination of aliphatic and aromatic carbon compounds. As further specific examples of such compounds may be mentioned naphthalene, anthracene, saturated aliphatic hydrocarbon oils (B. P. 150° C. to 300° C.), chlorobenzene, p-dichlorobenzene, trichlorobenzenes, tetrachlorobenzenes, pentachlorobenzenes, hexachlorobenzene, brombenzene, trichlorethylene, ethylene chloride, tetrachlorethylene, tetrachloroethane, hexachloroethane, toluene, xylenes (o, m and p), ethyl benzene, ethyl toluenes (o, m and p), butane, pentane, hexane, meta-brom-toluene, naphthenes, hexachlorhexylene, hexene, pentene, iodobenzene, ethylene bromide, ethylidene dibromide, ethylidene dichloride, benzene sulfonyl chloride, alpha-chloroanthraquinone, beta-chloroanthraquinone, acetic acid, oleic acid, propionic acid, benzene sulfonic acid, alpha-naphthalene sulfonic acid, beta-naphthalene sulfonic acid, alpha-anthraquinone sulfonic acid, beta-anthraquinone sulfonic acid, ortho-nitro-chlorbenzene, ortho-benzoyl benzoic acid, aniline, pyridine, para-nitrochlorobenzene, anthraquinone, and the like. Partially fluorinated compounds, such as, for example, fluorotrichloromethane and difluorotetrachloroethane may be further fluorinated.

The reaction with fluorine may be effected with or without the aid of a catalyst. Examples of substances which may be added in specific fluorinations are antimony fluorochlorides, iodine and antimony trifluoride.

In general, it is preferable that the fluorochloro aliphatic hydrocarbon used as a reaction medium be a solvent for the compound fluorinated. This is true of the compounds fluorinated as described in the examples. The particular solvent described in any given example is not the only solvent of this type which could be used, but, rather, the solvents could be interchanged within the limits of their physical properties. The choice of the reaction medium is preferably made on the basis of the temperatures at which the fluorination is carried out and of the properties of the products. When the reaction medium is a solvent for the compound fluorinated, it should preferably have a boiling point such that it is easy to separate from the products. Our preferred reaction media have been completely halogenated fluorochloro aliphatic hydrocarbons in which the fluorine was molecularly equal to or greater than chlorine. Mixtures, as well as definite chemical compounds, have been used. Examples of preferred compounds for this purpose are difluorodichloromethane, trifluorotrichloroethane, tetrafluorodichloroethane, pentafluorochloroethane, and mixtures thereof.

Generally speaking, the fluorine is preferably delivered above the surface of the liquid, although for the fluorination of resistant substances, it is desirable to deliver it just below the surface. Where the fluorine is delivered above the surface of the liquid, it is diluted with the inert vapors of the low boiling fluorochlorohydrocarbon. This procedure reduces the explosion risk and the violence of the reaction.

The fluorochloro aliphatic hydrocarbons, in general, act as solvents for fluorine as well as for organic compounds. An alternate mode of operation is that of adding fluorine to the fluorochloro aliphatic hydrocarbon, and subsequently adding the compound to be fluorinated, either per se or in solution. This mode of operation is of special value when the compound to be fluorinated is exceedingly reactive to fluorine.

The temperatures need not be restricted to those stated in the examples. As a general rule, the temperatures may conform to the activity desired, in any case preferably being sufficiently low to prevent formation of decomposition products. For very reactive substances, temperatures as low as −100° C. may be used, while for substances that react less easily with fluorine, temperatures as high as 0° C., or higher, may be employed. Our preferred temperature range has usually been −40° C. to −20° C. Ordinarily, the use of a reflux condenser is advantageous but not essential. By the proper choice of reaction media, the reaction may be carried out at the boiling point of the solution. For this mode of operation a reflux condenser is employed. An exceedingly effective way of conveying heat away from the reaction is thereby provided.

The pressure may be sub-atmospheric, atmospheric or super-atmospheric, depending largely upon the temperature and the boiling points of the compounds present in the reaction mixture. Thus, if the fluorochloro aliphatic hydrocarbon used as the reaction medium boils below the desired temperature of operation super-atmospheric pressures may be used in order to maintain it in liquid phase.

The process may be operated continuously or intermittently. The desired products may be separated from the reaction mixture in any suitable manner depending largely upon their physical and chemical properties. Separation may be effected, for example, by solvent extraction, by fractional distillation or crystallization, or by some other recognized method.

A wide variety of products may be obtained in accordance with the invention. Some of the products have properties which render them useful as solvents and reaction media. Others are useful as dyes and dye intermediates.

The invention provides a commercially practicable process for the production of organic fluorine compounds. Insofar as is known, such compounds have not been produced commercially by a reaction involving the use of elemental fluorine. Previous investigations have shown that the reaction of fluorine with organic materials is extremely energetic and generally causes pyrolysis of the organic material, resulting in the formation of carbon, tar or other undesirable carbonaceous decomposition products. By the application of the process of the present invention, these disadvantages are overcome. The inertness of the fluorochloro aliphatic hydrocarbons to fluorine and their solvent action on fluorine as well as a wide variety of organic compounds makes them especially suitable for use as reaction media. Furthermore, the vapor pressure-temperature relations of these compounds are such that they permit dilution of incoming fluorine with their vapors, thereby reducing the violence of reaction at the vapor-liquid interface.

As many apparently widely different embodiments of this invention may be made without departing from the spirit and scope thereof, it is to be understood that we do not limit ourselves to the specific embodiments thereof except as defined in the following claims.

We claim:

1. In a process of producing fluorine compounds, the step which comprises introducing fluorine above the surface of a reaction mixture comprising an organic material to be fluorinated and a liquid reaction medium substantially inert to fluorine and having an appreciable vapor pressure under the conditions of reaction.

2. The process of claim 1 in which the liquid reaction medium is a solvent for the material to be fluorinated and for fluorine.

3. The process of claim 1 in which the liquid reaction medium is a completely halogenated fluorochloro aliphatic hydrocarbon in which the number of fluorine atoms is at least equal to the number of chlorine atoms.

4. In a process of producing fluorine compounds, the step which comprises introducing fluorine above the surface of a reaction mixture comprising an organic material to be fluorinated and a substantially inert solvent medium which boils at about the reaction temperature.

5. In a process of producing organic fluorine compounds, the step which comprises reacting fluorine with an organic material in a liquid fluorochloro aliphatic hydrocarbon which is substantially inert to the reactants under the conditions of reaction.

6. In a process of producing carbon compounds containing fluorine, the step which comprises reacting fluorine with a carbon compound in the presence of a liquid fluorochloro aliphatic hydrocarbon which is a solvent for both the carbon compound and fluorine, and which is substantially inert under the conditions of reaction.

7. The process of claim 6 in which the liquid reaction medium is a completely halogenated fluorochloro aliphatic hydrocarbon in which the number of fluorine atoms is at least equal to the number of chlorine atoms.

8. The process of claim 6 in which the fluorination reaction is effected in the presence of a fluorinating catalyst.

9. The process of claim 6 in which the carbon compound to be fluorinated is a hydrocarbon.

10. The process of claim 6 in which the carbon compound to be fluorinated is an aliphatic halogenated hydrocarbon containing a halogen atom other than fluorine and which may contain fluorine but does not contain more than one atom of fluorine for each carbon atom.

11. The process which comprises reacting fluorine with a compound of the benzene series in the presence of a substantially inert liquid fluorochloro aliphatic hydrocarbon solvent medium in which the number of fluorine atoms is at least equal to the number of chlorine atoms.

12. In the reaction of fluorine with a compound of the benzene series to replace by a fluorine atom a hydrogen atom attached to a carbon atom of said compound, the step which comprises effecting the reaction in a solvent medium classed as completely halogenated and saturated fluorochloro hydrocarbons that contain less than three carbon atoms and also contain fluorine and chlorine in the atomic ratio of at least one fluorine atom to one chlorine atom, and mixtures thereof.

13. In the reaction of fluorine with a compound of the benzene series to replace by a fluorine atom a halogen atom other than fluorine attached to a carbon atom of said compound, the step which comprises effecting the reaction in a solvent medium classed as completely halogenated and saturated fluoro-chloro hydrocarbons that contain less than three carbon atoms and also contain fluorine and chlorine in the atomic ratio of at least one fluorine atom to one chlorine atom, and mixtures thereof.

14. The process which comprises reacting a chloro aliphatic hydrocarbon with fluorine in a solvent medium classed as completely halogenated and saturated fluoro-chloro hydrocarbons that contain less than three carbon atoms and also contain fluorine and chlorine in the atomic ratio of at least one fluorine atom to one chlorine atom, and mixtures thereof while maintaining said solvent in liquid phase at a temperature below that giving rise to the formation of decomposition products.

15. The process which comprises reacting fluorine with a halogenated aromatic hydrocarbon containing a halogen other than fluorine in a solvent medium classed as completely halogenated and saturated fluoro-chloro hydrocarbons that contain less than three carbon atoms and also contain fluorine and chlorine in the atomic ratio of at least one fluorine atom to one chlorine atom, and mixtures thereof, while maintaining said solvent in liquid phase at a temperature below that giving rise to formation of decomposition products.

16. The process which comprises reacting benzotrifluoride with fluorine in a solvent medium classed as completely halogenated and saturated fluoro-chloro hydrocarbons that contain less than three carbon atoms and also contain fluorine and chlorine in the atomic ratio of at least one fluorine atom to one chlorine atom, and mixtures thereof, while maintaining said solvent in liquid phase at a temperature below that giving rise to the formation of decomposition products.

17. The process which comprises reacting benzotrifluoride with fluorine in a solvent medium classed as completely halogenated and saturated fluoro-chloro hydrocarbons that contain less than three carbon atoms and also contain fluorine and chlorine in the atomic ratio of at least one fluorine atom to one chlorine atom, and mixtures thereof, while maintaining said solvent in liquid phase at a temperature of about —40° C. to about —20° C.

18. In a process of producing fluorine compounds, the step which comprises reacting fluorine with a carbon compound to be fluorinated in the presence of a reaction medium comprising difluorodichloromethane.

19. In a process of producing fluorine compounds, the step which comprises reacting fluorine with a carbon compound to be fluorinated in the presence of a reaction medium comprising trifluorotrichloroethane.

20. In a process of producing fluorine compounds, the step which comprises reacting fluorine with a carbon compound to be fluorinated in the presence of a reaction medium comprising tetrafluorodichloroethane.

HERBERT WILKENS DAUDT.
HOWARD MAURICE PARMELEE.